United States Patent [19]
Wynne Willson et al.

[11] Patent Number: 6,102,554
[45] Date of Patent: Aug. 15, 2000

[54] APPARATUS FOR MODIFYING A LIGHT BEAM

[75] Inventors: Peter David Wynne Willson, London; David Morrell, Oxford, both of United Kingdom

[73] Assignee: Wynne Willson Gottelier Limited, Kent, United Kingdom

[21] Appl. No.: 09/000,410

[22] PCT Filed: Jul. 26, 1996

[86] PCT No.: PCT/GB96/01817
  § 371 Date: Feb. 5, 1999
  § 102(e) Date: Feb. 5, 1999

[87] PCT Pub. No.: WO97/05423
  PCT Pub. Date: Feb. 13, 1997

[30] Foreign Application Priority Data

Jul. 26, 1995 [GB] United Kingdom .................. 9515328

[51] Int. Cl.$^7$ .................................................. F21V 14/08
[52] U.S. Cl. .................... 362/281; 362/283; 362/293; 362/321; 362/323; 359/889
[58] Field of Search .................. 362/280–284, 362/293, 321–324, 360; 355/71, 121; 396/505, 510; 359/739, 889

[56] References Cited

U.S. PATENT DOCUMENTS

| | | | |
|---|---|---|---|
| 3,183,776 | 5/1965 | Wallis | 396/510 |
| 3,433,142 | 3/1969 | King | 396/510 |
| 3,571,588 | 3/1971 | Hilzen | 362/281 |
| 4,018,527 | 4/1977 | Bartel et al. | 355/71 |
| 4,199,247 | 4/1980 | Schwarz | 396/510 |
| 4,257,086 | 3/1981 | Gulliksen | 362/279 |
| 4,435,075 | 3/1984 | Payrhammer et al. | 359/889 |
| 4,893,225 | 1/1990 | Solomon | 362/281 |
| 5,072,249 | 12/1991 | Yoshida | 396/510 |
| 5,073,847 | 12/1991 | Bornhorst | 362/293 |
| 5,207,494 | 5/1993 | Jones | 362/281 |
| 5,323,301 | 6/1994 | Kaufman | 362/293 |

FOREIGN PATENT DOCUMENTS

| | | |
|---|---|---|
| 0 447 211 A2 | 9/1991 | European Pat. Off. . |
| 2 621 681 | 10/1987 | France . |
| 2 027 917 | 2/1980 | United Kingdom . |

*Primary Examiner*—Alan Cariaso
*Attorney, Agent, or Firm*—Sterne, Kessler, Golstein & Fox P.L.L.C.

[57] ABSTRACT

Apparatus for modifying a beam of light, comprising at least one set of blades moveable across the beam, wherein each set of blades is arranged into a first subset of blades and a second subset of blades, and wherein the respective subsets of blades are axially spaced from each other. The apparatus is particularly suitable in apparatus comprising a light source and means for directing and/or focusing the light, and may be embodied (a) in a color changer for changing the color of light in a light beam, (b) in a diaphragm for varying the aperture, and (c) in dimmer apparatus for dimming light beam.

55 Claims, 12 Drawing Sheets

APPARATUS FOR MODIFYING A LIGHT BEAM

This invention relates to apparatus for modifying a light beam, in particular in apparatus comprising a light source and means for directing and/or focusing the light.

Embodiments of the invention relate to a colour changer, to a diaphragm and to a light dimmer. More particularly, the invention relates to an arrangement of moveable blades (a) in a colour changer for changing the colour of light in a light beam, (b) in a diaphragm for varying the aperture, and (c) for dimming a light beam.

It is desirable, in many lighting applications, to be able to vary the colour of light projected, for example spot lighting at discos or rock concerts or other varied, coloured lighting.

A colour changer is known from U.S. Pat. No. 4,893,225, and comprises a plurality of coloured, translucent leaves rotatably attached to a support frame and means for moving the leaves between a closed position and an open position to vary the colour of a light beam passing through intercepting leaves.

However, the total width of the mechanism is large, being approximately two and a half times the maximum width of the beam of emitted light. For lighting applications requiring large beams the width of this colour changer is prohibitive.

It is also known to scroll coloured plastic film across a light beam. The film is conveniently stored but rapid changes of colour are generally not possible.

Conventional iris-type diaphragms, found for example in cameras, projectors and spot lights, typically comprise a plurality of overlapping blades, the blades being moveable to vary the diaphragm aperture. In a known arrangement, described in EP-A-0372932, a set of overlapping blades are disposed around a central aperture. Each blade is mounted on one fixed pivot and one moveable pivot wherein movement of a cam against the moveable pivot rotates each blade so as to vary the diaphragm aperture.

Blades of such conventional diaphragms slidingly and touchingly overlap each other. It is accordingly necessary for blades to be thin and smooth and to be adapted to slide over each other, which may require some form of lubrication. When thin blades are used for long periods with a high intensity light source the blades can become very hot; excess heat can distort blade shape and may impair the function of the diaphragm.

In operation of known diaphragms, blades positioned for maximum aperture lie substantially flat and in the plane of the diaphragm, normal to the direction of light passing through the diaphragm. As the blades rotate towards the centre of the diaphragm, reducing the aperture, blades overlap with successively more other blades. The effect of the overlapping is that a portion of each blade is twisted up and out of the plane of the diaphragm. Consequently, blades can only be made out of a resilient, flexible material—which may not have ideal heat resistant properties.

Another disadvantage of this arrangement is that the diaphragm can not be completely closed, but instead has a minimum aperture, illustrated for example in FIG. 2 of EP-A-0372932. To close substantially completely the aperture, an additional shutter is required. This additional shutter can be bulky and if it can not be retracted out of the light beam, when not in use, can interfere with the light beam.

Instead of operating an additional shutter to close the aperture, the light source, such as a bulb, can be extinguished. This presents a problem in that frequent lighting and extinguishing of the bulb decreases its lifetime.

It is also known to dim the output of lighting apparatus. Incandescent bulbs can be dimmed to a certain extent by varying the power supplied, but this dimming can change the light colour temperature. Discharge lamps can not generally be dimmed in this way. When projecting stage or concert lighting it is known to provide at the outside of a spotlight a shutter arrangement to dim the emitted light. One such arrangement is an Aldis shutter made up of a series of rotatable, louvred blades. These rotate along an axis normal to the direction of light, thus when open they remain in the beam and can interfere with the beam. As the louvres close the dimming effect is often not even but seen as lighter and darker stripes across the beam.

The present invention seeks to solve these and other problems.

Accordingly, a first aspect of the present invention provides apparatus for modifying a beam of light, comprising at least one set of blades moveable across the beam, wherein each set of blades is arranged into a first subset of blades and a second subset of blades, and wherein the respective subsets of blades are axially spaced from each other.

In one embodiment, the blades are moveable between an open position in which they are retracted out of the light beam and a closed position in which a part but not all of the light beam is intercepted by blades in the first subset and a part but not all of the light beam is intercepted by blades in the second subset and in which the light beam is substantially totally intercepted. It is preferred that blades of the first subset are movable to and from a closed position in which the blades lie across 50–80%, more preferably 50–70%, of the total area of the light beam.

The shape of the blades of the apparatus is designed so that the light beam may be intercepted by combination of blades from the first and second subsets. A blade of the first subset of blades may therefore overlap a blade of the second subset of blades when the blades are in the closed position to ensure that the light beam is wholly intercepted by the blades. The blades of the first subset of blades may be a different shape to the blades of the second subset of blades. Additionally, or alternatively, one blade of a subset of blades may be a different shape to a blade of that same subset of blades. It is however preferred that the blades in each subset are the same shape and size and that the first and second subsets have the same number of blades.

The apparatus may further comprise a support structure circumscribing the axis of a light beam and wherein the blades are rotatably or pivotally mounted on the support structure and adapted to move inwardly towards the beam axis so as partially or substantially completely to intercept the beam. The first subset of blades is moveable either with or independently from the second subset of blades.

In a preferred embodiment the blades comprising the first subset of blades are substantially co-planar with each other, the blades comprising the second subset are substantially co-planar with each other, and the plane of the first subset of blades is axially spaced from and substantially parallel to the plane of the second subset of blades.

The apparatus offers the advantage that the individual blades in the first subset of blades do not come into contact with each other and the blades in the second subset of blades do not come into contact with each other. Blades are not twisted in use and are not displaced by successively overlapping other blades of the apparatus, allowing the use of rigid blade materials.

The periphery of the aperture of the apparatus is defined by respective portions of blades alternatively from the first and second subsets of blades, which are moveable in substantially parallel planes to vary the aperture. It is preferred that the separation between the blades of the first and second subsets is minimised, and particularly preferred that blades of the first subset substantially meet blades of the second subset leaving little or no gap between overlapping portions of first subset and second subset blades. A described embodiment of the invention has six blades per subset, making a total of 12 blades, although any number of blades between three and ten per subset are also suitable.

In embodiments of the present invention described below, each subset of blades has a corresponding set of cam means to move the blades to vary the aperture of the apparatus. The arrangement of the cam means is such that the cams for the first subset of blades are located on the front faces of the first subset of blades, the back surfaces of the first subset of blades are proximal to the front surfaces of the second subset of blades and the cam means for moving the second subset of blades are located on the back surfaces of the second subset of blades. Using this arrangement, the first and second subsets of blades are positioned close to each other around a central point of the aperture of the apparatus. It is particularly preferred that the rear faces of the front subset of blades are substantially co-planar and are positioned tight to the front surfaces of the second subset of blades.

In another preferred embodiment of the present invention, each blade has a width that narrows toward the tip, which is pointed, and the tips of the first subset of blades meet substantially at the centre of the aperture. The blades of the second subset also narrow to pointed tips and the tips meet substantially at the centre of the aperture. Thus, the first and second subsets of blades of this particular embodiment are capable of closing, for example, a diaphragm aperture substantially to zero. This avoids the need for a separate shutter. In a typical arrangement of this embodiment, the first subset of blades consists of n blades spaced equi-distantly around the aperture and the second subset of blades also consists of n blades spaced equi-distantly around the aperture. Each tip of each blade makes an angle of between $360/2n°$ and $360/n°$. In a particularly preferred embodiment of the invention, the first and the second subset of blades each consists of six blades and the tip of each blade makes an angle at the centre of between 30 and 45°, more preferably between 31 and 40°, and most preferably about 33–35°.

Apparatus according to the present invention is conveniently employed (a) in a colour changer for changing the colour of light in a light beam, (b) in a diaphragm for varying the aperture, or (c) in apparatus for dimming a light beam.

First, a colour changer for changing the colour of a beam of light thus comprises apparatus as described above, each of the blades being coloured, or non-coloured but non-transparent.

The term "colour changer" as used herein includes apparatus for producing any lighting effect obtained using translucent blades. Suitable blades for a colour changer are thus selected from blades that are coloured and transparent; coloured and non-transparent; coloured and wholly or partially frosted; coloured and wholly or partially diffusing; coloured and wholly or partially lenticular (such as a fresnel lens); coloured and diffracting; coloured and prismatic; non-coloured and non-transparent; non-coloured and wholly or partially frosted; non-coloured and wholly or partially diffusing; non-coloured and wholly or partially lenticular (such as a fresnel lens); non-coloured and diffracting; and, non-coloured and prismatic.

The blades of different embodiments can be chosen so that the apparatus may act as a colour changer, a diffusion grating, a Fresnel lens, a prismatic lens, apparatus for diffusing a light beam, apparatus for diffracting a light beam, or any combination thereof. A colour changer for colouring a beam blue thus comprises a set of blue blades, that is to say first and second subsets of like-coloured blue blades. A colour changer for frosting a light beam thus comprises first and second subsets of like-(wholly or partially)-frosted blades.

The use of two subsets of coloured blades allows each blade to be of reduced width, facilitating location of blades out of the light beam at the periphery of the colour changing means, reducing the overall apparatus width. In a preferred embodiment, retracted blades occupy an annular space with a width of no more than one half the maximum light beam diameter.

The blades of a colour changer typically form an aperture which presents to the beam of light passing through a jagged edge. This is illustrated in the description below of specific embodiments.

Many suitable materials for the blades will be known to a person of skill in this art. Suitable materials include coloured glass, in particular dichroic glass and coloured plastic. The blades may be formed from diffusion glass, from glass with frosted tips, from white frosted glass, from coloured frosted glass, and from coloured glass. The blades may be lenticular for use as a Fresnel lens, prismatic or formed to comprise a diffraction grating.

Typically the colour changer comprises three sets of blades; each set of blades being moveable independently from any one of the other sets of blades. With blades coloured yellow, cyan and magenta, or alternatively green, red and blue, or any other suitable combination of colours, the apparatus is used to project light of substantially any colour.

A colour changer of a specific embodiment of the invention is described below and comprises three sets of 12 blades, each set having two subsets of 6 blades, and the respective sets being coloured, for example, red, green and blue and operable to vary the colour of a light beam through substantially the whole of the visible spectrum. The blades of each subset are substantially co-planar and mounted in parallel planes spaced along the axis of an aperture through which light passes in use. The colour changer includes means for attachment to the front of a spotlight.

Secondly, a diaphragm thus comprises apparatus as described above wherein opaque blades are moveable to vary the diaphragm aperture.

The boundary of the aperture is formed by portions of blades from alternately the first and second subsets and is substantially smooth. This is in contrast to the aperture in the colour changer described above and the dimmer described below, in both of which the boundary is typically jagged.

Diaphragm blades of each subset do not displace each other during use, i.e. no blade of either subset touches any other blade of the same subset. A diaphragm according to the present invention thus can be made using blades that are not limited to thin, flexible blades. As a result, the blades can be made of a rigid material. Ceramic blades, having high-heat resistance are particularly useful in this regard. Other suitable materials include composite materials, asbestos substitute, glass and carbon fibre. The result is a diaphragm that can withstand extremes of temperature without distortion.

In use of a diaphragm of a preferred embodiment of the present invention, diaphragm blades are pivotally mounted on a first annular plate located around an aperture. Each blade comprises at least one projection that locates, respectively, within a cam groove or a cam recess on a second plate. Relative movement of the first and second plates produces pivotal movement of the blade towards or away from the centre of the aperture. In a particular preferred diaphragm, a first subset of blades is mounted on a first outside plate and each blade has a first projection that locates in a pivot hole in the first outside plate and a second projection that locates in a cam groove on an interior plate. A second subset of blades is mounted on a second outside plate, each blade having a projection that locates in a pivot hole in the second outside plate and a projection that locates in a cam groove on the interior plate. Considered from the front, the diaphragm comprises, in order, first outside plate, first subset of blades, interior plate, second subset of blades, second outside plate. Relative rotation of the interior plate against the first and second outside plates pivots the blades to close or open the aperture, the first and second outside plates preferably being adapted to move, or remain stationary, in unison.

In specific embodiments of the diaphragm of the present invention a blade is pivotally mounted and pivots in use about a first pivot point. The distance from the first pivot point to the centre of the aperture may vary, e.g. such that as the diaphragm aperture is closed the distance decreases and then increases. The variation of this distance is adopted so that inner edges of diaphragm blades form a continuous aperture circumference.

Known diaphragm blades have an inner edge which is formed by a single arc. Such blades are suitable for use in apparatus of the invention such as a diaphragm. It is also known to adjust the design of the inner edge of a diaphragm blade so that the diaphragm aperture is as close as possible to circular. EP-A-0372932 describes a particular blade edge design for this purpose. Again, such designs are suitable in apparatus of this invention.

In typical lighting apparatus in which the iris-type diaphragm according to a preferred embodiment of the apparatus of the invention can be used, an arrangement of hot and/or cold mirrors is used to reduce the risk of equipment failure due to overheating. A hot mirror, reflecting heat not light, can be placed across the light beam (possibly at a shallow angle) to reflect heat away from the diaphragm. A cold mirror can be located at 45° to the beam, to reflect the beam at 90° and separate heat therefrom.

Another heat reducing possibility, in an embodiment of the invention, is for blades to have a surface that is reflective and substantially non-planar. Thus, incident light can be dispersed. A stippled surface is suitable. Alternatively, the surface of the blades can be other than orthogonal to the optical axis of the beam, such as at an angle thereto of 5+° or 10+°, to reflect light away from, for example, the diaphragm but not straight back towards the light source.

Thirdly, a dimmer thus comprises apparatus as described above wherein the blades are arranged around an aperture and moveable to dim a beam of light passing therethrough.

It is optional that means are provided for separate movement of, respectively, the first and second subsets of blades. This has the advantage of allowing close control of the extent of dimming. In use, the blades of the first subset are first moved to alter the dimming affect. Thereafter, the blades of the second subset are moved for further adjustment of the dimming.

The amount of dimming achievable can vary from 0% (no dimming) upwards. It is preferred that the blades of the respective first and second subsets are closable to a position where in co-operation substantially 100% dimming can be achieved. Dimmer blades could be translucent, in which case the maximum dimming seen when all blades are in the closed position would be less than 100%, but generally dimmer blades are opaque.

In a second aspect the invention provides an iris-type diaphragm, comprising a plurality of opaque blades forming a diaphragm aperture and moveable to vary the aperture, wherein the blades are arranged into a first subset of blades and a second subset of blades and wherein during movement of the blades no blade of either subset touches any other blades in the same subset.

In an embodiment of this second aspect, a first blade is adapted to pivot in a substantially planar path to and from an open position, and a second blade adjacent to the first blade is adapted to pivot in a substantially planar path to and from an open position, said paths being in planes substantially parallel to and spaced from each other. The first blade is included in the first subset of blades, with the second blade included in the second subset of blades.

In a third aspect the present invention provides a rigid, opaque, iris-type diaphragm blade.

A preferred diaphragm blade has a pointed tip. A further preferred diaphragm blade has an inside edge, successive portions of which form, in use, a portion of the periphery of the diaphragm aperture, which inside edge is chamfered towards the aperture. This design assists in maintaining a sharp aperture definition when diaphragm blades are of increased thickness.

Preferred features of the present invention will now be described, purely by way of example only, with reference to the accompanying drawings, in which.

Figure 1A:
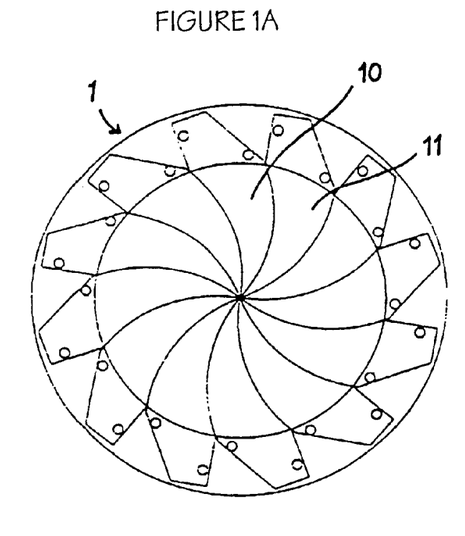
FIG. 1 shows a schematic diagram of an iris-type diaphragm according to the invention.
Figure 1B:
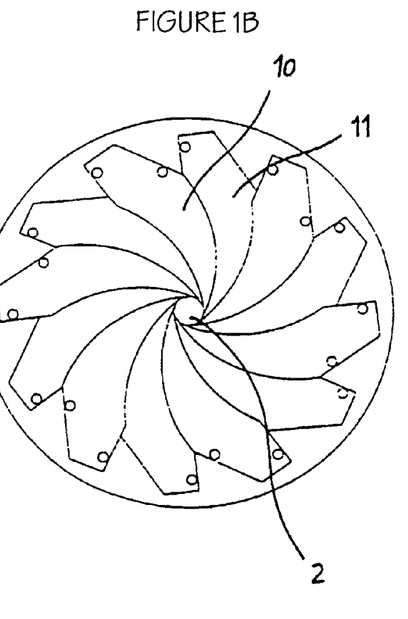
Figure 1C:
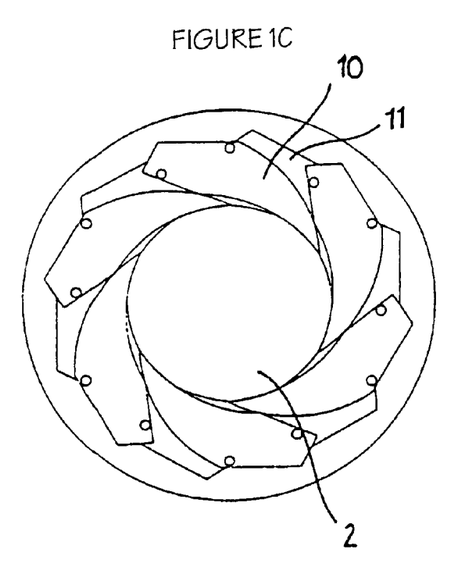
Figure 1D:
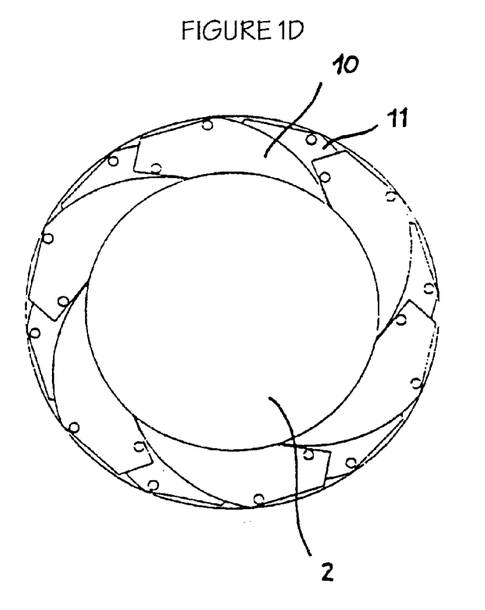
Figure 2A:
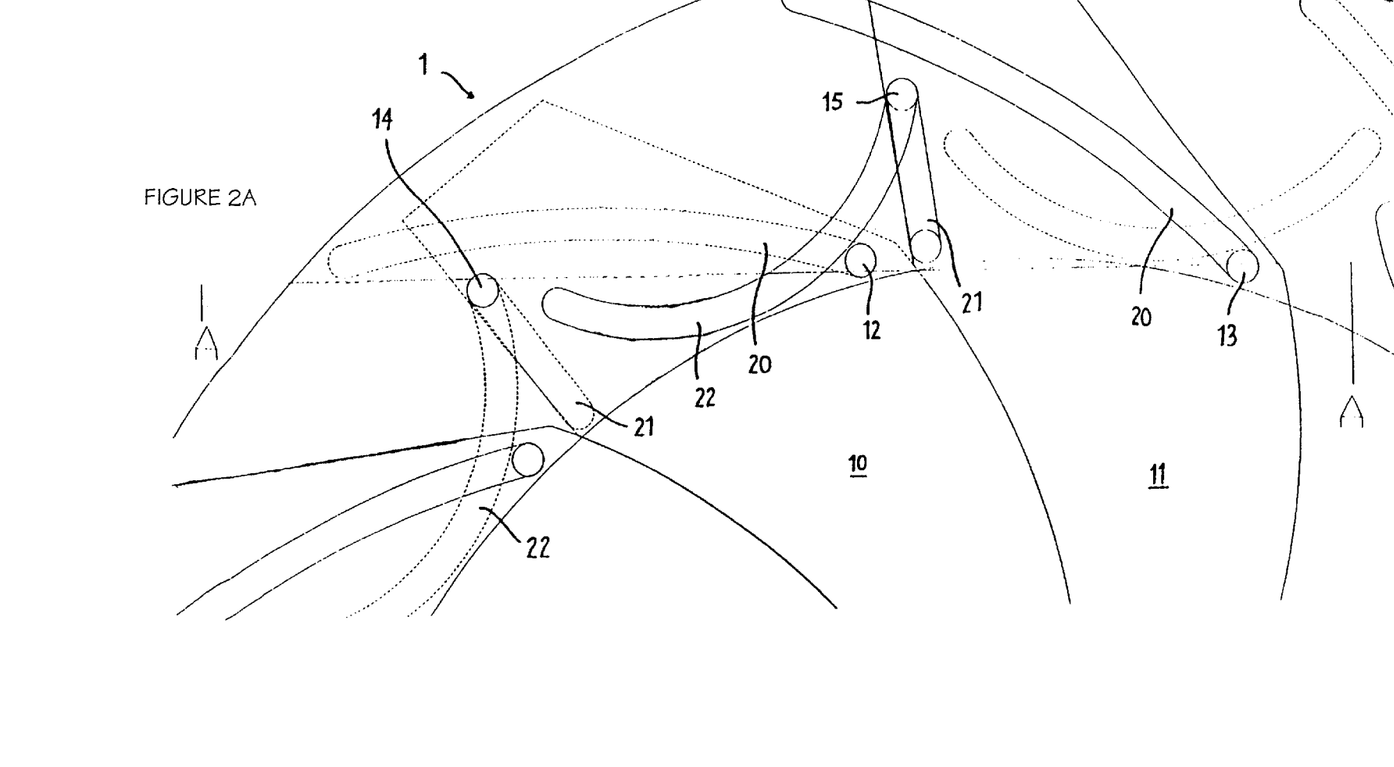
FIG. 2 shows details of the iris-type diaphragm of FIG. 1, including a cross section of a portion thereof.
Figure 2B:
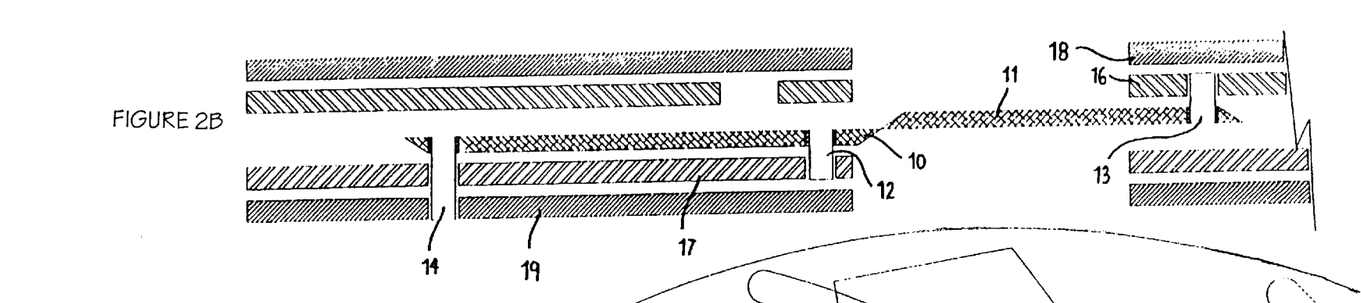
Figure 3:
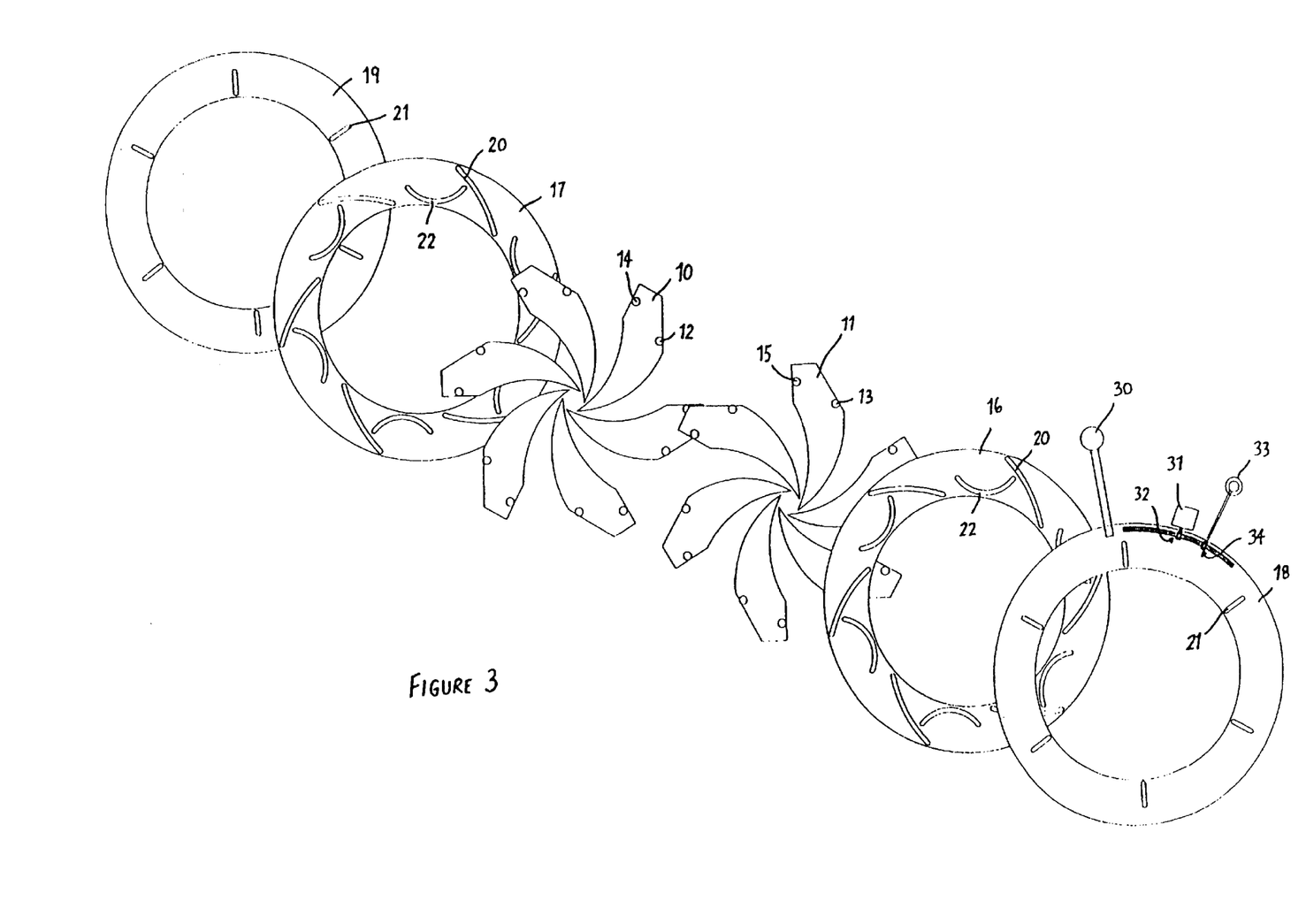
FIG. 3 shows a schematic exploded view of an iris-type diaphragm according to the invention.

Referring to FIGS. 1–3, an iris-type diaphragm comprises blades 10 of a first subset of diaphragm blades and blades 11 of a second subset of diaphragm blades evenly spaced around the radius of an aperture 2.

FIG. 1(a). shows the diaphragm fully closed and FIG. 1(d) shows the diaphragm fully open, with FIGS. 1(b) and 1(c) showing the diaphragm in a number of different intermediate positions. It is seen that at no position does a blade 10 of the first subset of blades overlap with another blade 10 of the first subset, and likewise that no blade 11 of the second subset of blades overlaps with any other blade 11.

FIGS. 2 and 3 illustrate the mechanism for closing and opening the aperture of the iris-type diaphragm shown generally as 1. A blade 10 of the first subset of blades has a first projecting pin 12 that co-operates with a groove 20 in a fixed plate 17, and a pin 14 that co-operates with a groove 21 also in fixed plate 17. The pin 14 also co-operates with a groove 22 in moving plate 19.

Blade 11 of the second subset of blades has a first pin 13 that co-operates with groove 20 in fixed plate 16, and a second pin 15 that co-operates with groove 21 in fixed plate 16. Pin 15 also co-operates with a groove 22 in moving plate 18.

It is seen that blades 10 of the first subset and blades 11 of the second subset are mounted so that their chamfered edges are proximal to each other, the chamfered edges extending towards the diaphragm aperture.

The arrangement of the iris-type diaphragm is that there is an outer moving plate 19, the fixed plate 17, the subset of first blades 10, the subset of second blades 11, the fixed plate 16 and then the outer moving plate 18. The fixed plates 16 and 17 are adapted not to move relative to each other. Further, the moving plates 18 and 19 are adapted not to move relative to each other. In operation, the moving plates 18 and 19 are rotated about an axis approximately in the centre of the aperture of the diaphragm, thus being rotated relative to the fixed plates 16 and 17. This rotation causes projections 12, 14 and 13, 15 in respectively the first and second subsets of blades to be driven by cam surfaces in the grooves 20, 21 and 22 of the fixed and moving plates 16 and 17, and 18 and 19 respectively, thereby moving the diaphragm blades into or out of the aperture and causing the aperture to be closed or open.

As a blade 10, for example, of the first subset of blades is moved by the relative rotation of moving plate 19 against fixed plate 17, it is seen that the blade 10 rotates about pivot point 14, and that the distance of between pivot point 14 and the centre of the aperture of the diaphragm varies, becoming as the aperture is closed progressively closer to the aperture and then progressively further away as it follows groove 21 in fixed plate 17. With this cam arrangement the blade 10 at no time overlaps any other blade 10 in the first subset of blades. Moreover, in the embodiment shown in FIG. 1, the tips of the blades in the respective subsets meet at or near the centre of the beam.

FIG. 3 also illustrates various examples of means for causing relative movement of fixed plate and moving plate. Movement can be achieved using a handle 30 attached to the moving plate 18, by a motor 31 attached by attachment and drive means 32 to the plate 18, or by hand activated turning means 33 and attachment and driving means 34 again attached to the moving plate 18.

The shape of the blades is not limited to that shown in FIGS. 1 and 3, and the mechanism by which the blades are moved between the open and closed positions is also not so limited, as illustrated in following embodiments.

While this embodiment of the present invention has been described for use as an iris-type diaphragm, the arrangement of blades and other apparatus therein is also suitable for obtaining a concentric coloured effect or a concentric gobo effect (pattern effect) using suitably coloured and/or translucent blades, dimming the light beam using opaque or partially opaque blades, diffusing the light beam using suitably frosted blades or blades with frosted tips, forming a Fresnel lens using lenticular blades, forming a prismatic lens or forming a diffraction grating.

Figure 4A:
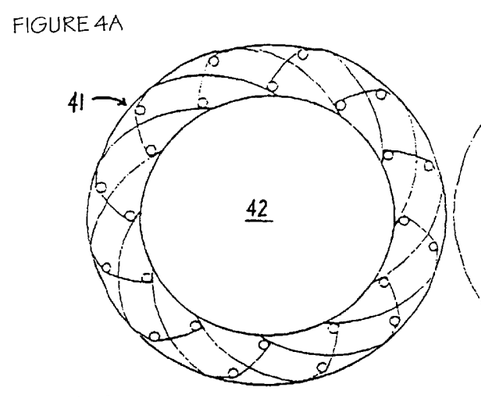
FIG. 4 shows a schematic diagram of a colour-changer according to the invention.
Figure 4B:
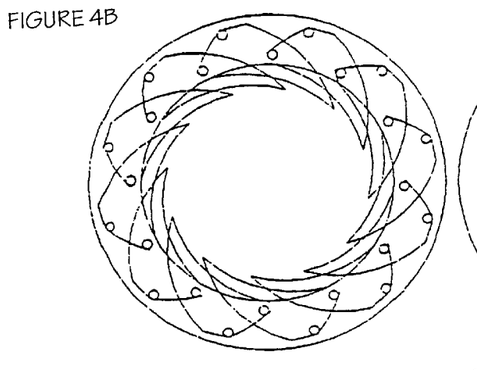
Figure 4C:
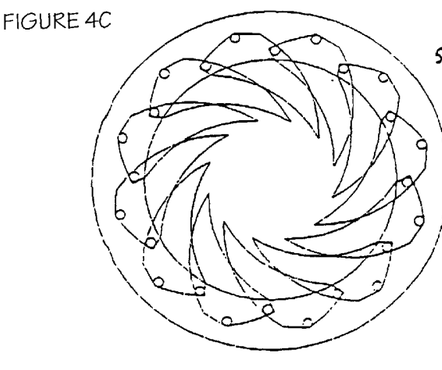
Figure 4D:
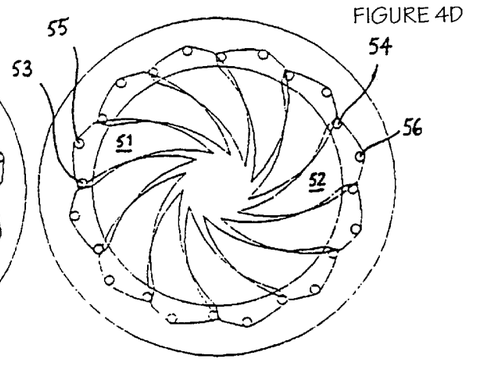
Figure 4E:
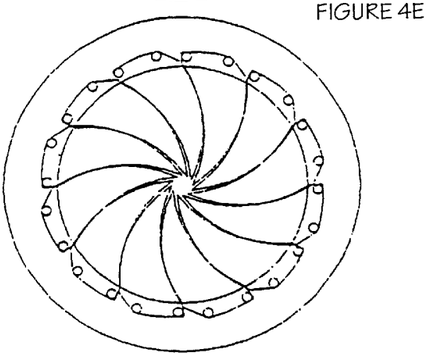
Figure 4F:
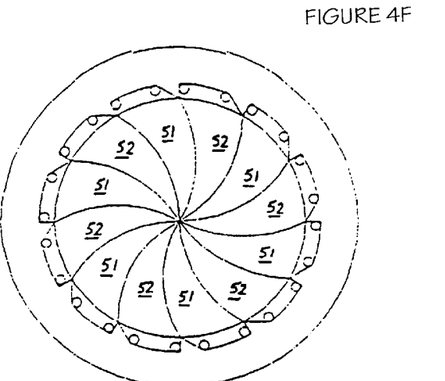
Figure 5:
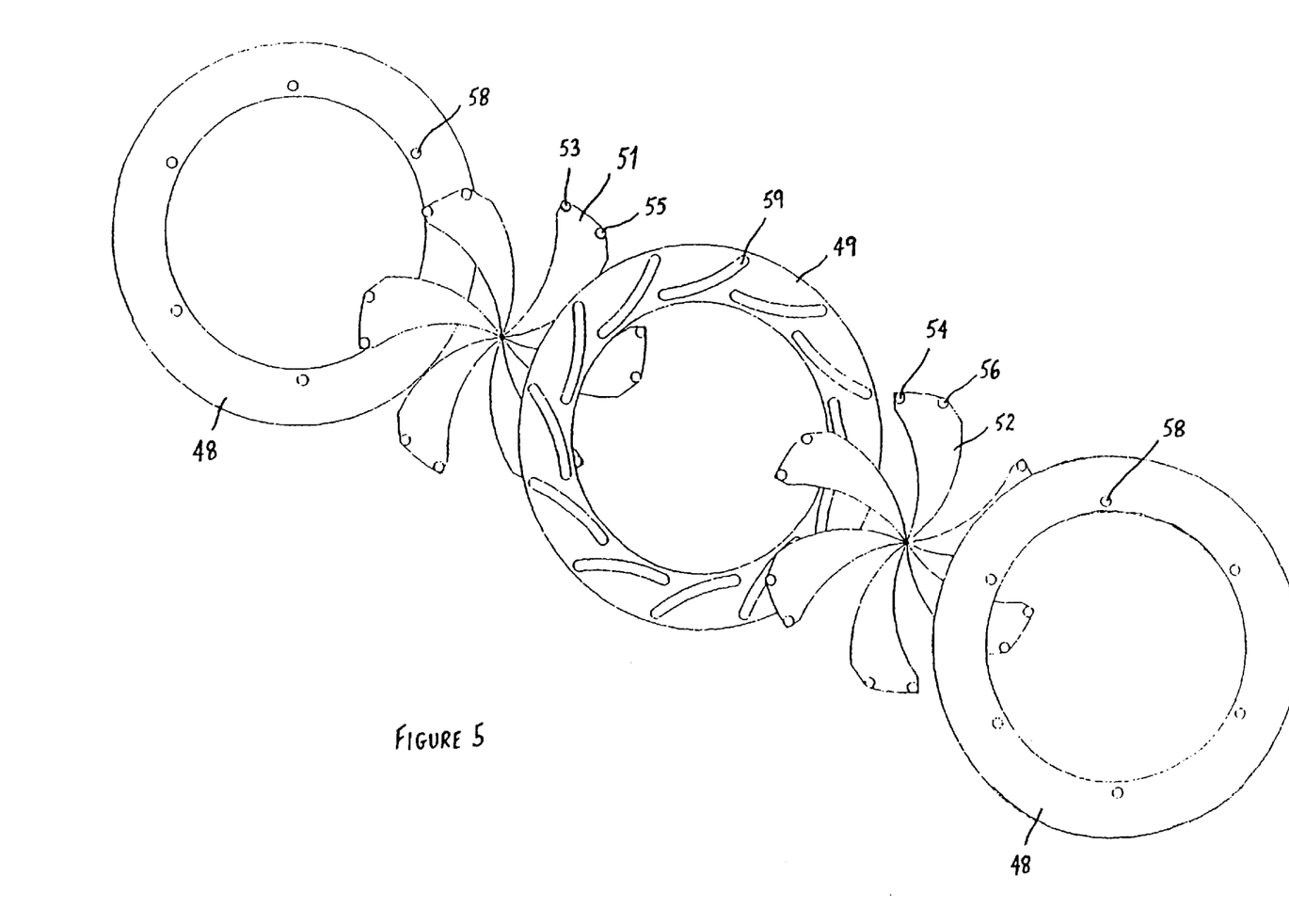
FIG. 5 shows an exploded schematic diagram of a colour-changer according to the invention.

Referring to FIGS. 4 and 5, a colour changer is illustrated comprising blades 51 of a first subset of coloured blades and blades 52 of a second subset of like-coloured blades mounted on a colour changer shown generally as 41 and surrounding an aperture 42.

Each blade 51 is mounted on pivots 53 and 55 and each blade 52 is mounted on pivots 54 and 56.

FIG. 4(f) shows the colour changer in a closed position in which all light passing through the aperture 42 is coloured. FIG. 4(a) shows the colour changer in an open position in which substantially all light passing through the aperture is not coloured by any of blades 51 or 52. FIGS. 4(b), (c), (d) and (e) illustrate intermediate positions of the colour changer. It is seen that in no position of the colour-changer does a blade 51 overlap with another blade 51 of the first subset of blades, likewise for all blades 52 of the second subset.

FIG. 5. illustrates the mechanism for moving the coloured blades into and out of the light beam. The mechanism includes a cam location 58 in a first outer ring 48 to co-operate with fixed pin 53 in blade 51 and groove 59 in an inner ring 49 adapted to receive inner projecting pin 55 of the blade 51. Cam location 58 receives outer projecting pin 54 from blade 52 and groove 59 receives inner projecting pin 56 from blade 52. The two outer rings 48 are adapted not to rotate relative to each other. Rotation of inner ring 49 relative to outer rings 48 pivots blades 51 and 52 about pivots 53 and 54 to move blades 51 and 52 into or out of the light beam to vary the colour thereof. FIG. 4 shows how the outer circumference of the aperture, when the colour-changer is in a position intermediate between fully open and fully closed, present a circumference that is jagged. While this embodiment has been described in relation to a colour-changer, the embodiment is suitable for use as a dimmer if coloured blades are replaced by opaque blades.

Figure 6:
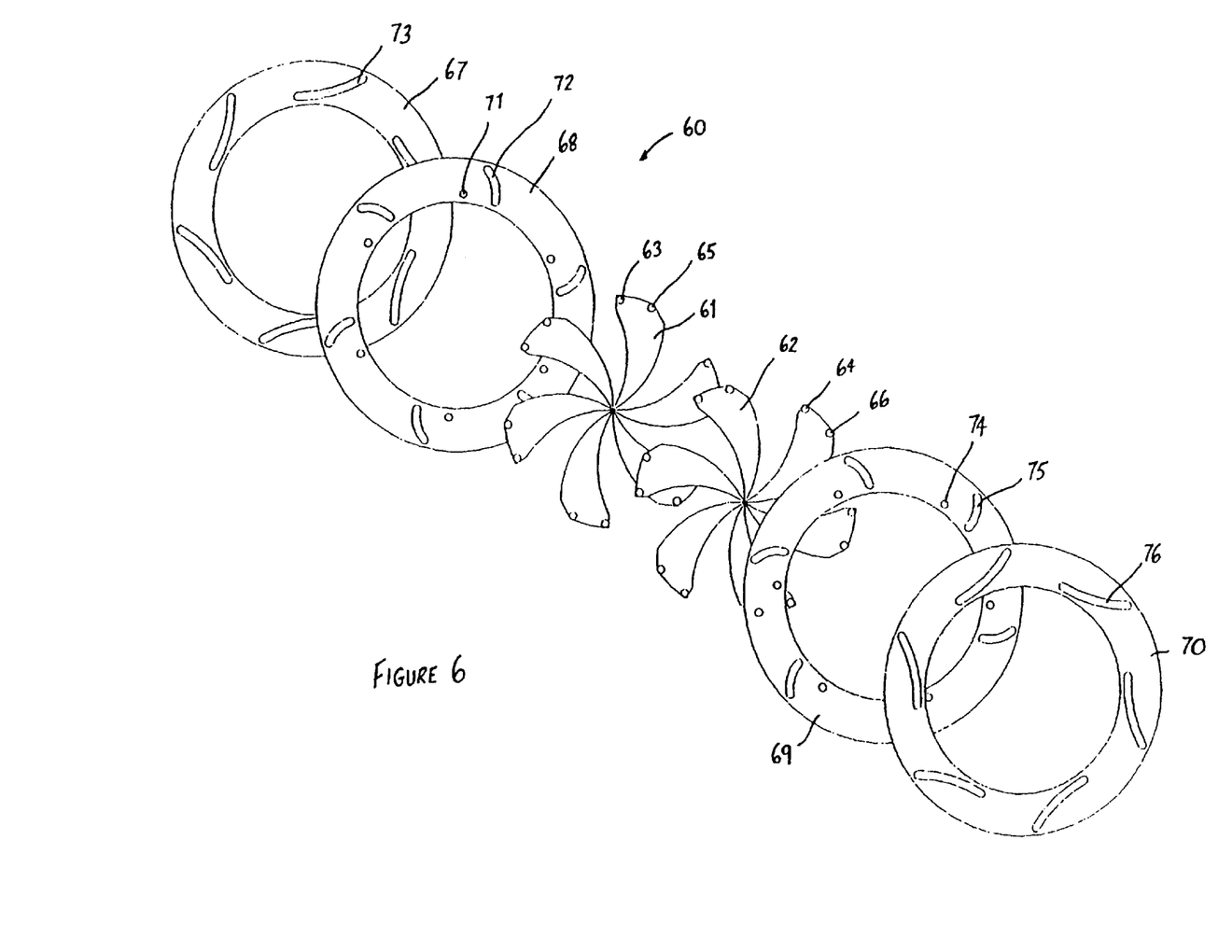
FIG. 6 shows an exploded, schematic diagram of another iris-type diaphragm according to the invention.

FIG. 6. illustrates a diaphragm in which the diaphragm is shown generally as 60. The diaphragm includes blades 61 of a first subset of blades, all blades substantially co-planer, spaced from blades 62 of a second subset of substantially co-planer blades. The material of blades 61 and 62 is opaque.

Each blade 61 has a first pivot projection 63 and a second pivot projection 65. First pivot projection 63 co-operates with hole 71 in moving plate 68. Second projecting pin 65 co-operates with slot 72 in moving plate 68 and a cam surface in groove 73 in fixed plate 67. Relative rotation of plate 67 against plate 63 results in movement of the blades 61 of the first subset of blades into or out of the aperture of the diaphragm. The movement of the first subset of blades is separate to that of the second subset.

In the second subset of blades, each blade 62 has a first projecting in 64 that locates in hole 74 in moving plate 69. A second projecting pin 64 co-operates with slot 75 in moving plate 69 and a cam surface in groove 76 in fixed ring 70. Relative movement of plate 69 and 70 results in pivoting of each blade 62 about fixed pivot 64 and consequent movement of the blade 62 into or out of the light beam.

When all blades 61 and all blades 62 are in a fully closed position, the blades co-operate to the extent that substantially no light passes through the diaphragm. When the first subset of blades 61 is substantially in the closed position while blades 62 of the second subset are in a fully open position, no more that 50% of light passes through the aperture of the diaphragm.

In FIG. 7, an iris-type diaphragm is illustrated comprising blades 81 of a first subset of blades and blades 82 of a second subset of blades surrounding an aperture 42. In this embodiment, the blades are substantially trapezoidal in shape, each subset of blades comprising five blades.

The mounting of the blades in the diaphragm is similar to that colour changer shown in FIG. 5. Each blade 81 is mounted on pivot 83 and has pin 85 and each blade 82 is mounted on pivot 84 and has pin 86.

Figure 7A:
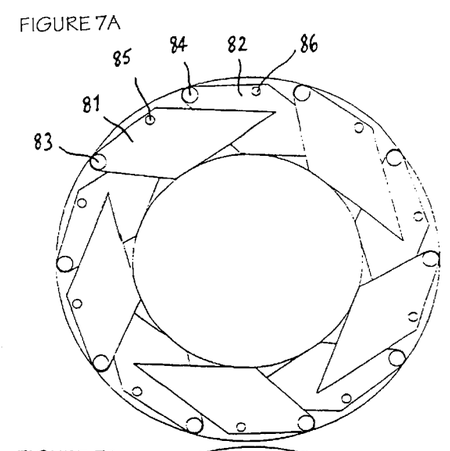
FIG. 7 shows a schematic diagram of yet another iris-type diaphragm according to the invention.
Figure 7B:
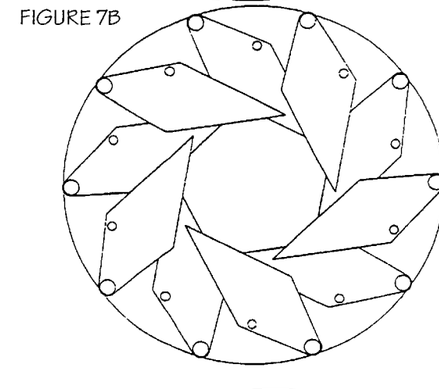
Figure 7C:
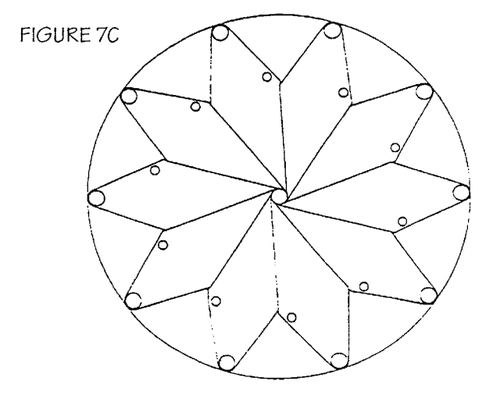
Figure 7D:
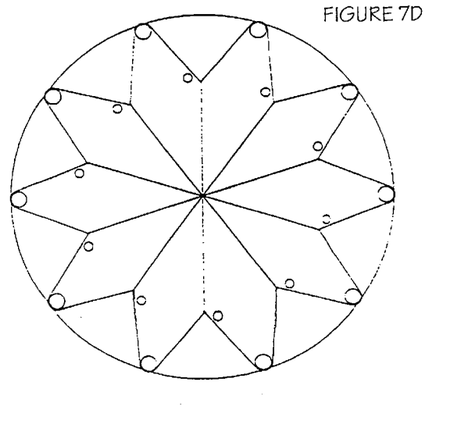
Figure 7E:
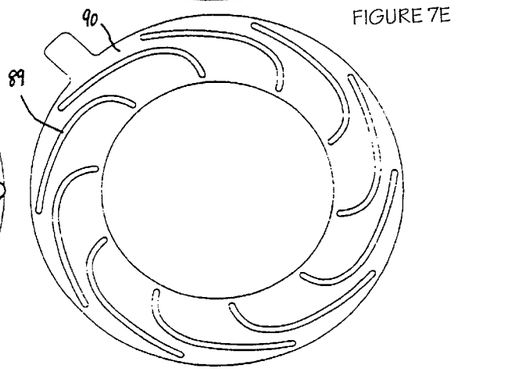
Figure 7F:
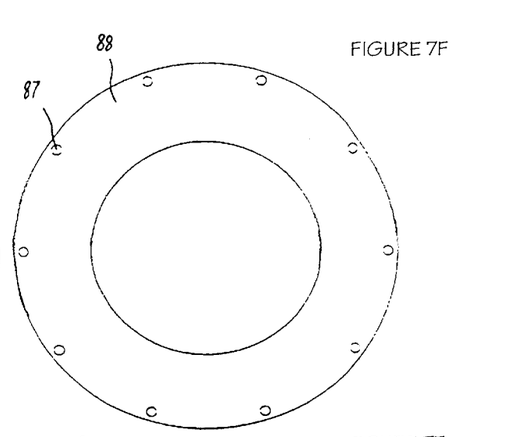

FIG. 7(a) shows the diaphragm in an open position and FIG. 7(d) shows the diaphragm in a closed position. FIGS. 7(b) and 7(c) illustrate intermediate positions of the diaphragm. It is seen that in no position of the diaphragm does a blade 81 overlap with another blade 81 of the first subset of blades, likewise for all blades 82 of the second subset.

The diaphragm includes pivot locations 87 in plate 88 to co-operate respectively with pivot 83 in blade 81 and pivot 84 in blade 82. Alternate grooves 89 in plate 90 are adapted to receive inner projecting pin 85 of the blade 81 and inner projecting pin 86 of the blade 82.

Rotation of plate 90 relative to plate 88 pivots blades 81 and 82 about pivots 83 and 84 to move blades 81 and 82 into or out of the light beam.

FIGS. 8 to 11 illustrate an alternative mechanism for effecting movement of the blades of the apparatus.

Figures 8A, 8B:
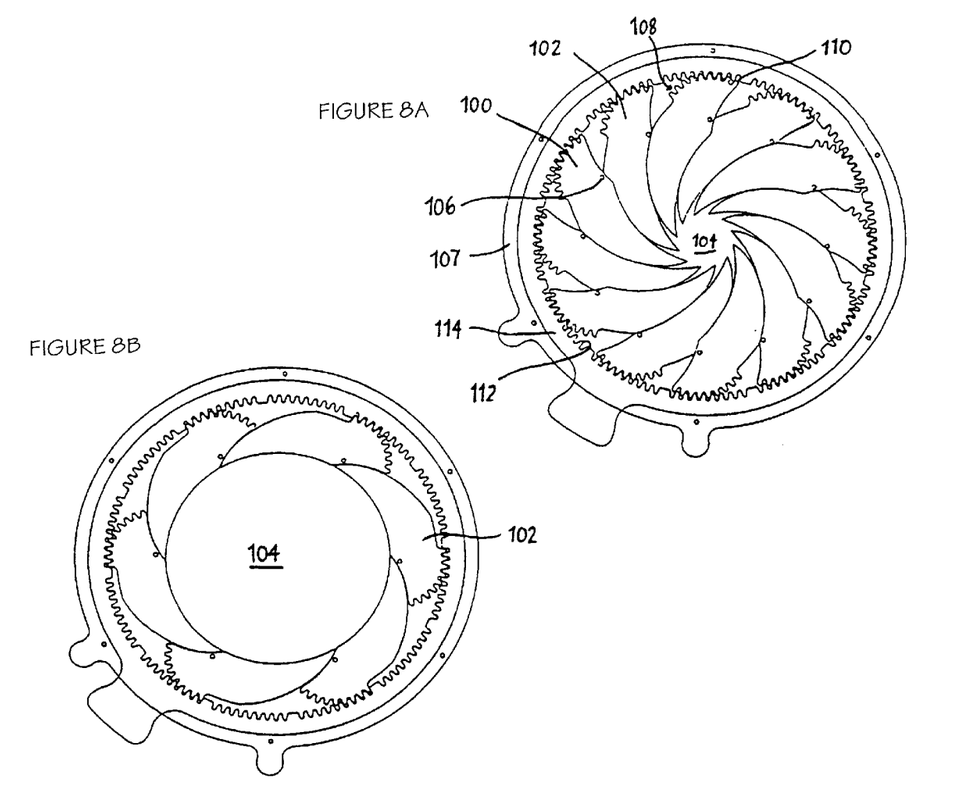
FIG. 8 shows a schematic diagram of another colour-changer according to the invention.

FIG. 8(a) illustrates a colour-changer comprising blades 100 of a first subset of blades and blades 102 of a second subset of blades surrounding an aperture 104. Each blade includes a pivot 106 cooperating with a pivot location in a plate 107 similar to plate 88 shown in FIG. 7(f). A portion 108 of the periphery of each blade includes tooth-like projections 110.

Teeth 110 on each blade cooperate with tooth-like projections 112 formed on the substantially circular inner periphery of moveable annular member, or ring, 114 disposed intermediate the two fixed plates and adapted to receive teeth 110 in the detents therebetween. Rotation of the moveable ring 114 relative to the outer rings pivots the blades 100 and 102 about pivots 106 to move the blades into and out of the light beam to vary the colour thereof, teeth 110 and 112 acting as a rack and pinion mechanism to rotate the blades.

FIG. 8(b) shows the colour-changer of FIG. 8(a) with blades 100 removed for greater clarity and the blades 102 in an open position. It will be understood that in no position of the colour changer does a blade 100 overlap with another blade 100 of the first subset of blades, likewise for all blades of the second subset. It can also be seen clearly in FIG. 8(b) that, with the blades in the open position, each of said blades occupies an annular space around the light beam which space has a width no more than one half the maximum light beam diameter.

In the colour changer shown in FIG. 8, rotation of a single moveable ring 114 effects movement of both the first and the second subset of blades. However, two such moveable rings may be provided, one moveable ring for each subset of blades. One moveable ring may be rotated independently from the other moveable ring so that a subset of blades is moved independently from the other subset of blades. Such an arrangement is suitable when the apparatus is used as a dimmer.

Figure 9:
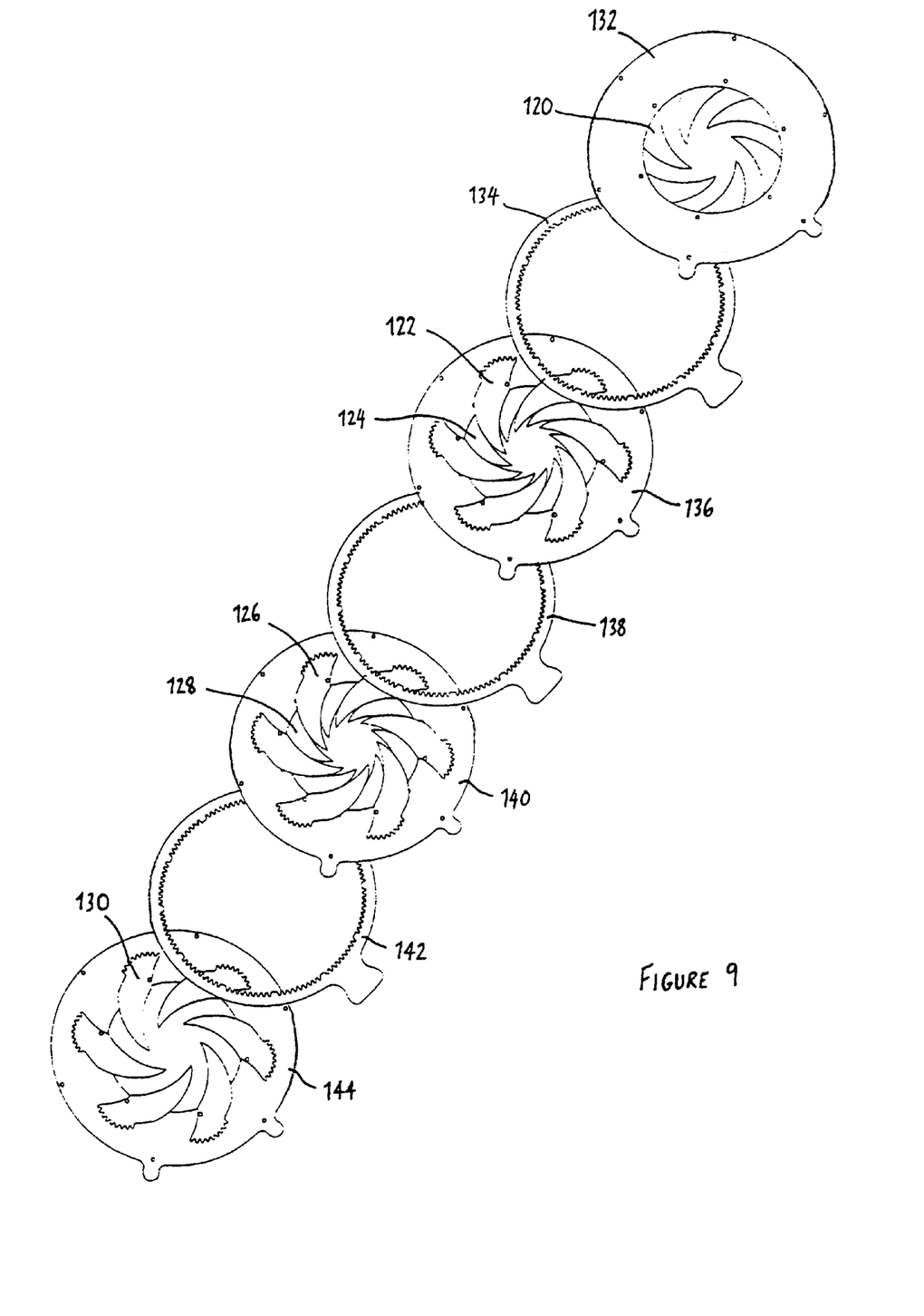
FIG. 9 shows an exploded schematic diagram of another colour-changer according to the invention.

FIG. 9 illustrates a colour-changer comprising three sets of blades, each set of blades being a different colour and moveable independently from each of the other sets of blades. In this embodiment, blades 120 of the first subset and blades 122 of the second subset are red, blades 124 of the third subset and blades 126 of the fourth subset are blue and blades 128 of the fifth subset and blades 130 of the sixth subset are green. The particular colour of each set of blades is not so limited and may be varied so that the blades are operable to vary the colour of a light beam through substantially the whole of the visible spectrum.

The blades of each subset are substantially co-planar and mounted in parallel planes spaced along the axis of an aperture through which light passes in use. The arrangement of this colour-changer is that there is a fixed plate 132, subset of blades 120, moveable ring 134, subset of blades 122, fixed plate 136, subset of blades 124, moveable ring 138, subset of blades 126, fixed plate 140, subset of blades 128, moveable ring 142, subset of blades 130 and fixed plate 144. The fixed plates are adapted not to move relative to each other. The operation of this colour changer is similar to that described with reference to FIG. 8; movement of one of the moveable rings, for example ring 134, moves one set of blades only, in this example red blades 120 and 122.

Figure 10A:
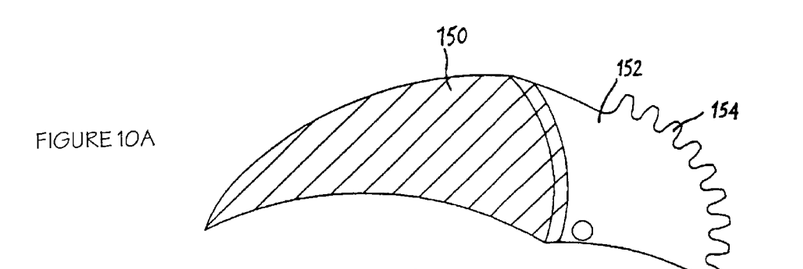
FIG. 10 shows a schematic diagram of a blade of a colour-changer according to the invention.
Figure 10B:
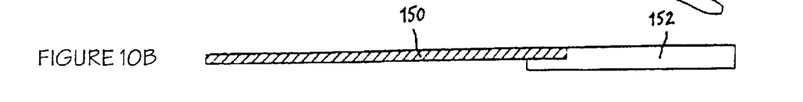

A blade of a colour-changer shown in FIGS. 8 and 9 may be formed from a single piece of material. Alternatively, as shown in FIG. 10, the blade may comprise two portions 150 and 152. Portion 150 is formed from material suitable for use in changing the colour of light, for example dichroic glass or coloured plastic. Portion 152 in which tooth-like projections 154 are formed is shaped so as not to interfere with the light passing through the colour changer and therefore may be formed from any material in which teeth 154 may be formed.

Figure 11A:
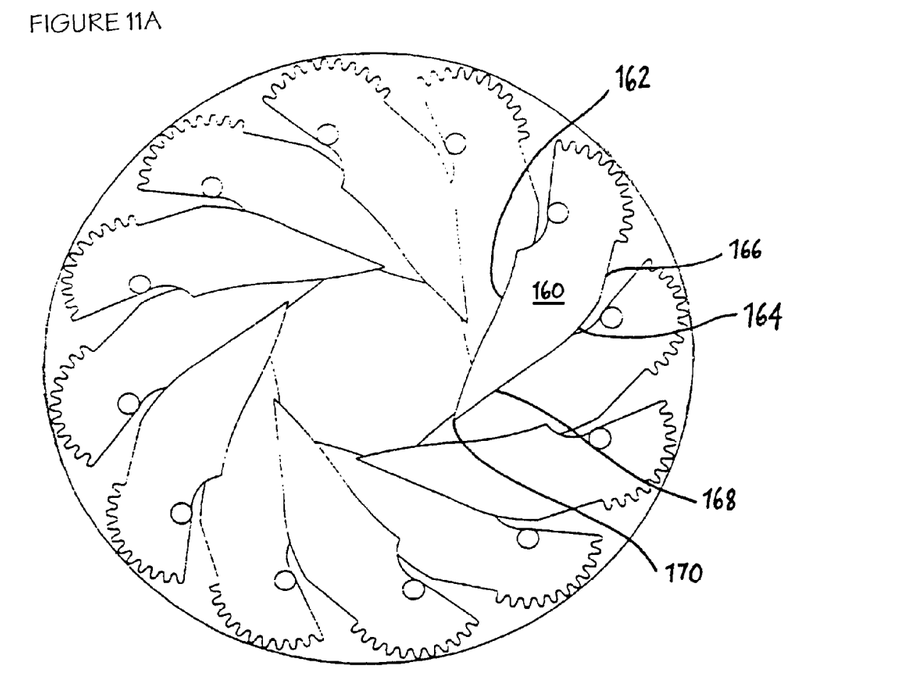
FIGS. 11(a) and (b) show schematic diagrams of a further two iris-type diaphragms according to the invention.
Figure 11B:
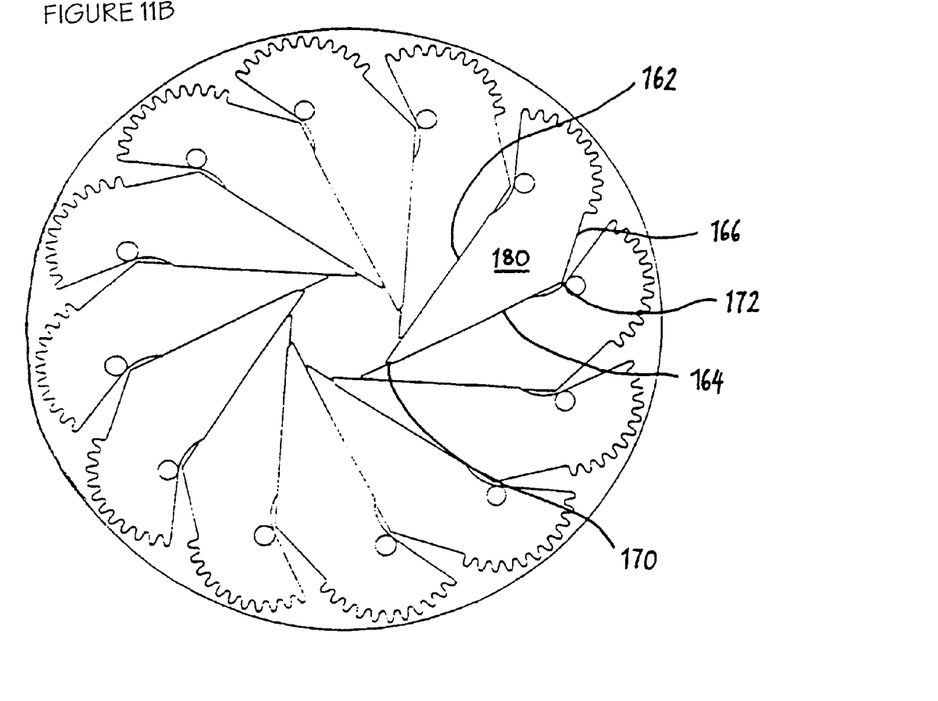
Figure 12:
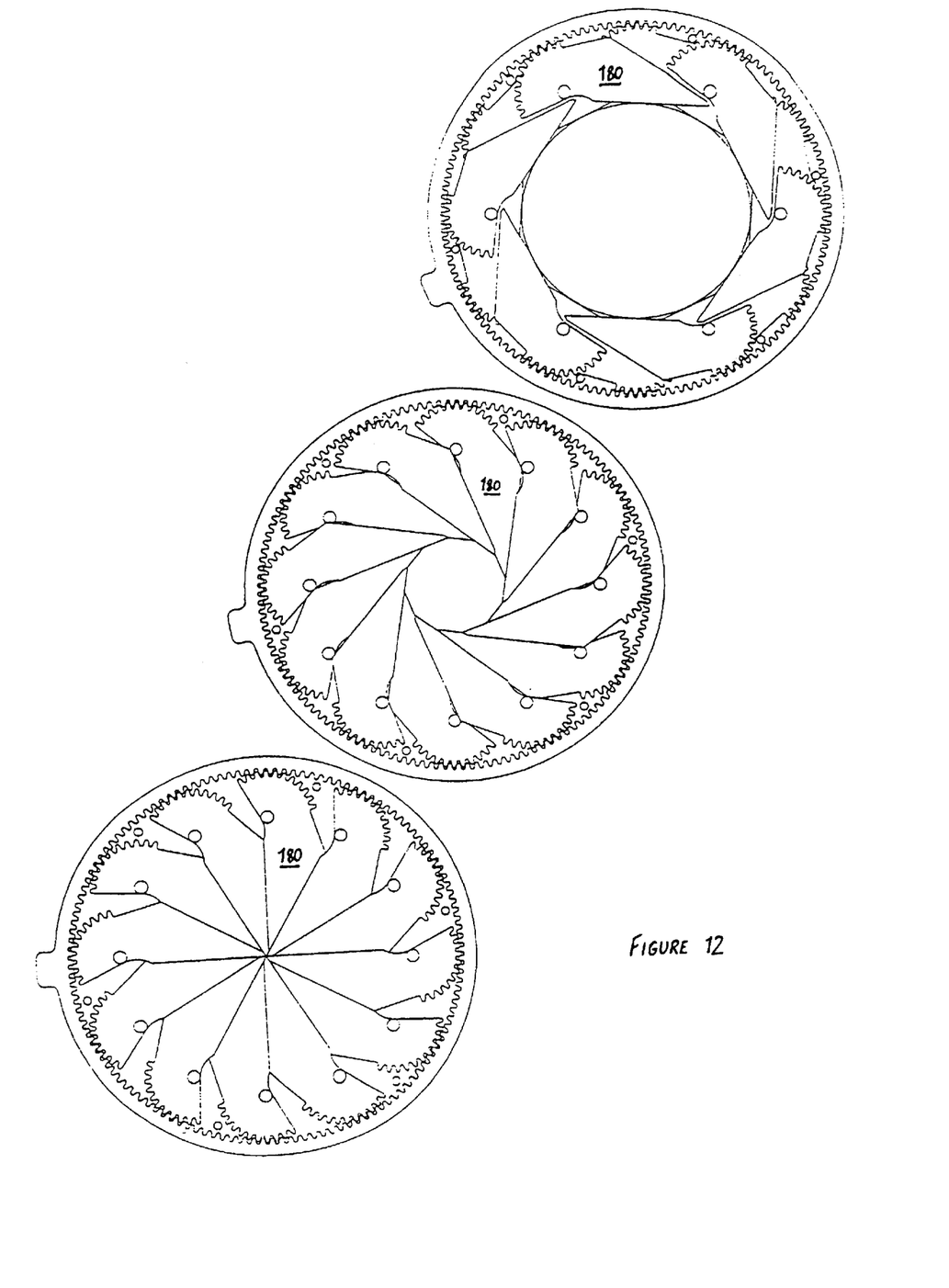
FIG. 12 shows further schematic diagrams of the diaphragm shown in FIG. 11(b)

This rack and pinion mechanism for moving the blades of the colour-changer is also suitable for use in both a diaphragm and dimmer embodying the present invention. For example, FIG. 11 shows the arrangement of examples of the blades of such an iris-type diaphragm. The blades 160 in FIG. 11(a) have a curved edge 162 and curved edge 164 extending between straight edges 166 and 168, edge 168 extending between the curved edge 164 and sharp point 170. In FIG. 11(b) blade 180 has straight edge 162, straight edges 166 and 168 meeting at corner 172, and a relatively blunt point 170. Both sets of blades are moveable so that a blades of one subset of blades does not overlap another blade of the same subset at any position of the blades, as shown in FIG. 12 for the blades of FIG. 11(b). The shape of blades 160 is preferred to that of blades 180 in that the aperture 182 defined by blades 160 is less jagged than that of aperture 184 defined by blades 180. However, the jaggedness of aperture 184 has minimal effect of the efficiency of the diaphragm in operation.

Figure 13A:
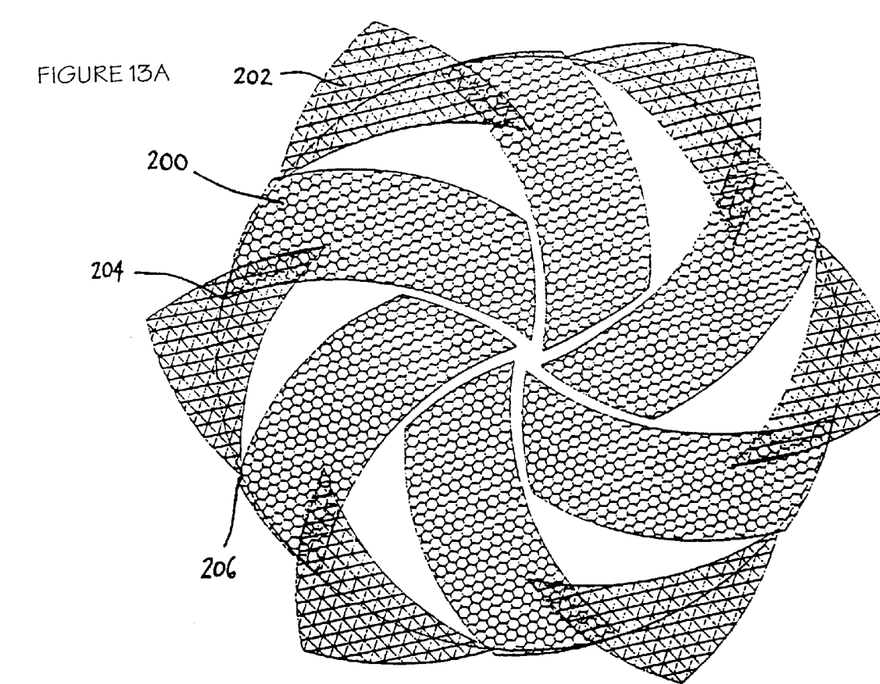
FIG. 13 shows a schematic diagram showing a colour changer in which the blades of the first subset are a different shape to the blades of the second subset.
Figure 13B:
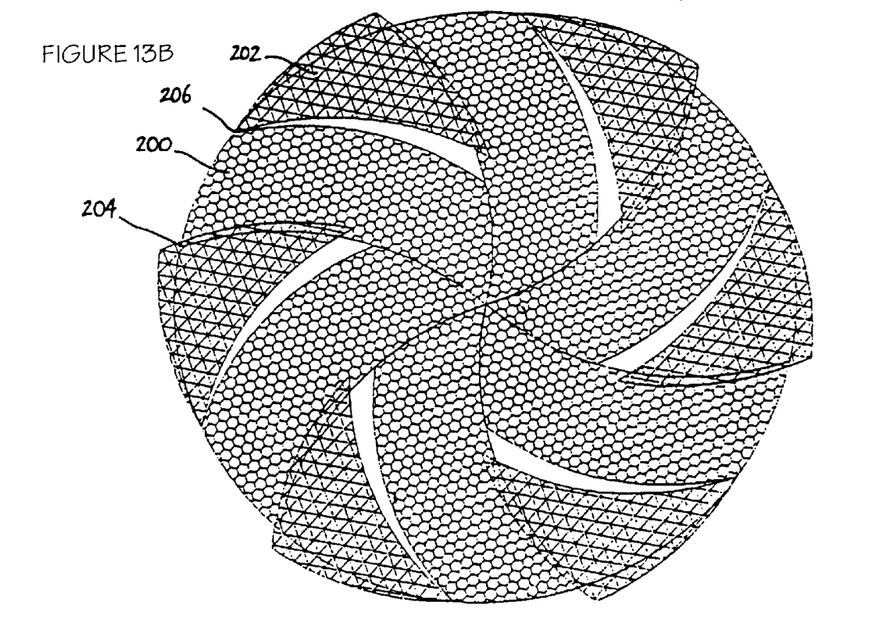

The shape of the blades of the first set of blades may be different to that of the second set of blades. For example, FIG. 13 shows a colour changer in which blades 200 of the first set of blades are a different shape to the blades 202 of the second subset of blades. In this embodiment, blades 200 rotate about fixed pivot 204 and blades 202 rotate about fixed pivot 206, FIG. 13(a) showing blades 200 in an intermediate position and FIG. 13(b) showing the same blades in a closed position.

The apparatus described including the specific iris-type diaphragm, colour-changer and dimmer apparatus have a wide range of applications in the lighting field. The material chosen for the blades will depend upon the particular application, but includes coloured, frosted, dichroic, diffused, refracting and mirrored glass; ceramics; sintered or alloy metals and polymers. The use of reflecting material for the blades, optionally coupled with a dichroic lamp reflector or separate filter for a luminaire type application, allows manufacture of lighting apparatus that can remain cool during use and minimises the side-effects of heat from the light beam.

Two or more of the iris-type diaphragm, colour-changer and dimmer may be used conveniently in lighting apparatus comprising a light source and means for focusing the light emitted therefrom.

Each feature disclosed in this specification (which term includes the claims and drawings) may be incorporated in the invention independently of other disclosed and/or illustrated features.

What is claimed is:

1. Apparatus for modifying a beam of light, comprising at least one set of blades moveable across the beam, wherein said at least one set of blades is arranged into a first subset of co-planar blades and a second subset of co-planar blades, wherein the respective subsets of blades are axially spaced from and parallel to each other and wherein the blades are moveable between an open position in which they are retracted out of the light beam and a closed position in which a part but not all of the light beam is intercepted by blades in the first subset and a part but not all of the light beam is intercepted by blades in the second subset and in which the light beam is substantially totally intercepted by said blades.

2. Apparatus for modifying a beam of light, comprising at least one set of blades moveable across the beam, wherein said at least one set of blades is arranged into a first subset of blades and a second subset of blades, the respective subsets of blades are axially spaced from each other, no blade of either subset overlaps any other blade of the same subset and wherein the blades are moveable between an open position in which they are retracted out of the light beam and a closed position in which a part but not all of the light beam is intercepted by blades in the first subset and a part but not all of the light beam is intercepted by blades in the second subset and in which the light beam is substantially totally intercepted by said blades.

3. Apparatus according to claim 2 wherein the blades comprising the first subset of blades are substantially co-planar with each other, the blades comprising the second subset are substantially co-planar with each other, and the plane of the first subset of blades is axially spaced from and substantially parallel to the plane of the second subset of blades.

4. Apparatus according to claim 1 wherein the light beam has a total area, and wherein in said closed position the blades of said first subset of blades lie across 50–70% of the total area of the light beam.

5. Apparatus according to claim 1, wherein the first subset of blades is moveable with the second subset of blades.

6. Apparatus according to claim 1, wherein the first subset of blades is moveable independently from the second subset of blades.

7. Apparatus according to claim 1 wherein both the first and second subsets have a number of blades, the first and second subsets of blades having the same number of blades.

8. Apparatus according to claim 7 wherein each subset of blades has one of 3, 4, 5 and 6 blades.

9. Apparatus according to claim 1 wherein each blade has a tip, and wherein the blades are moveable to a closed position in which tips of blades in the respective subsets meet at or near the centre of the beam.

10. Apparatus according to claim 1 wherein the light beam has an axis, the apparatus comprising a support structure circumscribing the axis of the light beam and wherein the blades are rotatably mounted on the support structure and adapted to move inwardly towards the beam axis so as at least partially to intercept the beam.

11. Apparatus according to claim 1 wherein the light beam has an axis, the apparatus comprising a support structure circumscribing the axis of the light beam and wherein the blades are pivotally mounted on the support structure and adapted to move inwardly towards the beam axis so as at least partially to intercept the beam.

12. Apparatus according to claim 11 wherein said support structure includes at least one rotatable annular member having an inner periphery, said at least one inner periphery including means cooperating with one or more blades to effect pivotal movement of said one or more blades upon rotation of said annular member.

13. Apparatus according to claim 12, comprising two such annular members, each annular member being rotatable to effect pivotal movement of a respective subset of blades.

14. Apparatus according to claim 12, comprising one such annular member, said annular member being rotatable to effect pivotal movement of both the first subset and the second subset of blades.

15. Apparatus according to claim 12 comprising a rack and pinion mechanism to effect movement of the blades, each blade including a pinion cooperating with an associated rack disposed on the internal periphery of said at least one annular member.

16. A colour changer for changing the colour of a beam of light, comprising apparatus as claimed in claim 1 wherein each of the blades is coloured.

17. A colour changer according to claim 16 wherein the blades are moveable to an open position in which each of said blades occupies an annular space around said light beam which space has a width no more than one half the maximum light beam diameter.

18. A colour changer according to claim 16 comprising three sets of said blades, wherein each set of blades is a different colour and is moveable independently from each of the other sets of blades.

19. An iris-type diaphragm comprising a set of opaque blades moveable across the beam, wherein the set of blades is arranged into a first subset of blades and a second subset of blades, and wherein the respective subsets of blades are axially spaced from each other and the blades are moveable between a closed position through intermediate positions to an open position and wherein when blades are in intermediate positions, no blade of either subset touches any other blade of the same subset.

20. A diaphragm according to claim 19 wherein the diaphragm has an aperture, the diaphragm aperture being formed by portions of alternate blades from respectively the first subset and the second subset of blades.

21. A diaphragm according to claim 19 that can be closed substantially to allow no light to pass.

22. A diaphragm according to claim 19 in which the diaphragm has an aperture and each blade has an edge portion, and in which edge portions of the blades in the first and second subsets are chamfered towards the diaphragm aperture.

23. A diaphragm according to claim 19 wherein said blades comprise ceramic blades.

24. A diaphragm according to claim 19 wherein said blades comprise reflective blades.

25. A diaphragm according to claim 19 in which each blade is pivotally mounted on a pivotal mounting on a support structure circumscribing the axis of the light beam, the diaphragm has an aperture, and wherein the distance between the pivotal mounting and the centre of the aperture of the diaphragm varies as the diaphragm aperture varies.

26. A dimmer for dimming a beam of light comprising apparatus according to claim 1 wherein the blades are arranged around an aperture and moveable to dim a beam of light passing therethrough.

27. A dimmer according to claim 26 wherein said blades comprise opaque blades.

28. A dimmer according to claim 26 comprising means for separate movement of, respectively, the first and second subsets of blades.

29. An iris-type diaphragm, comprising a plurality of opaque blades forming a diaphragm aperture and moveable across a beam of light to vary the aperture, wherein the blades are arranged into first and second subsets, wherein during movement of the blades no blade of either subset engages any other blade in the same subset and wherein the blades are moveable between an open position in which they are retracted out of the light beam and a closed position in which a part but not all of the light beam is intercepted by blades in the first subset and a part but not all of the light beam is intercepted by blades in the second subset and in which the light beam is substantially totally intercepted by said blades.

30. Lighting apparatus comprising a light source, means connected thereto for focusing light emitted therefrom, an iris-type diaphragm according to claim 19 connected to said means for focusing and colour changing means according to claim 16 connected to said means for focusing.

31. Lighting apparatus comprising a light source, means connected thereto for focusing light emitted therefrom, an iris-type diaphragm according to claim 19 connected to said means for focusing and a dimmer according to claim 16 connected to said means for focusing.

32. Lighting apparatus comprising a light source, means connected thereto for focusing light emitted therefrom, colour changing means according to claim 16 connected to said means for focusing and a dimmer according to claim 26 connected to said means for focusing.

33. Lighting apparatus according to claim 32 further comprising an iris-type diaphragm according to claim 55 connected to said means for focusing.

34. Apparatus according to claim 2 wherein the light beam has a total area, and wherein in said closed position the blades of said first subset of blades lie across 50–70% of the total area of the light beam.

35. Apparatus according to claim 2, wherein the first subset of blades is moveable with the second subset of blades.

36. Apparatus according to claim 2, wherein the first subset of blades is moveable independently from the second subset of blades.

37. Apparatus according to claim 2 wherein both the first and second subsets have a number of blades, the first and second subsets of blades having the same number of blades.

38. Apparatus according to claim 37 wherein each subset of blades has 3–6 blades.

39. Apparatus according to claim 2 wherein each blade has a tip, and wherein the blades are moveable to a closed position in which tips of blades in the respective subsets meet at or near the centre of the beam.

40. Apparatus according to claim 2 wherein the light beam has an axis, the apparatus comprising a support structure circumscribing the axis of the light beam and wherein the blades are rotatably mounted on the support structure and adapted to move inwardly towards the beam axis so as at least partially to intercept the beam.

41. Apparatus according to claim 2 wherein the light beam has an axis, the apparatus comprising a support structure circumscribing the axis of the light beam and wherein the blades are pivotally mounted on the support structure and adapted to move inwardly towards the beam axis so as at least partially to intercept the beam.

42. Apparatus according to claim 41 wherein said support structure includes at least one rotatable annular member having an inner periphery, said at least one inner periphery including means cooperating with one or more blades to effect pivotal movement of said one or more blades upon rotation of said annular member.

43. Apparatus according to claim 42, comprising two such annular members, each annular member being rotatable to effect pivotal movement of a respective subset of blades.

44. Apparatus according to claim 42, comprising one such annular member, said annular member being rotatable to effect pivotal movement of both the first subset and the second subset of blades.

45. Apparatus according to claim 42 comprising a rack and pinion mechanism to effect movement of the blades, each blade including a pinion cooperating with an associated rack disposed on the internal periphery of said at least one annular member.

46. A colour changer for changing the colour of a beam of light, comprising apparatus as claimed in claim 2 wherein each of the blades is coloured.

47. A colour changer according to claim 46 wherein the blades are moveable to an open position in which each of said blades occupies an annular space around said light beam which space has a width no more than one half the maximum light beam diameter.

48. A colour changer according to claim 46 comprising three sets of said blades, wherein each set of blades is a different colour and is moveable independently from each of the other sets of blades.

49. A dimmer for dimming a beam of light comprising apparatus according to claim 2 wherein the blades are arranged around an aperture and moveable to dim a beam of light passing therethrough.

50. A dimmer according to claim 49 wherein said blades comprise opaque blades.

51. A dimmer according to claim 49 comprising means for separate movement of, respectively, the first and second subsets of blades.

52. Lighting apparatus comprising a light source, means connected thereto for focusing light emitted therefrom, an iris-type diaphragm according to claim 19 connected to said means for focusing and colour changing means according to claim 46 connected to said means for focusing.

53. Lighting apparatus comprising a light source, means connected thereto for focusing light emitted therefrom, an iris-type diaphragm according to claim 19 connected to said means for focusing and a dimmer according to claim 49 connected to said means for focusing.

54. Lighting apparatus comprising a light source, means connected thereto for focusing light emitted therefrom, colour changing means according to claim 46 connected to said means for focusing and a dimmer according to claim 49 connected to said means for focusing.

55. Lighting apparatus according to claim 54 further comprising an iris-type diaphragm according to claim 19 connected to said means for focusing.

* * * * *